Patented Feb. 6, 1940

2,189,205

UNITED STATES PATENT OFFICE 2,189,205

CARBONATES OF HYDROXYBENZOIC ACID ESTERS

Ernest F. Grether and Russell B. Du Vall, Midland, Mich., assignors to The Dow Chemical Company, Midland, Mich., a corporation of Michigan No Drawing. Application May 31, 1938,
Serial No. 211,015

6 Claims. (Cl. 260—463)

This invention concerns certain new chemical compounds, namely, the carbonates of hydroxybenzoic acid esters, and in particular concerns carbonates having the general formula:

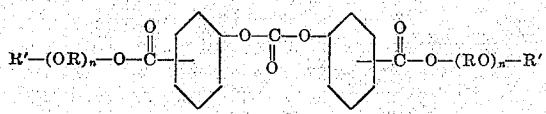

wherein R represents an alkylene radical containing at least 2 carbon atoms, R' represents hydrogen or an alkyl radical, and $n$ represents an integer.

These compounds vary from high-boiling, viscous liquids to crystalline solids. They are soluble or miscible in many organic solvents and do not readily decompose or become discolored. They are useful as intermediates in the preparation of other organic chemicals and as plasticizing agents for vinyl resin, e. g., polystyrene, and cellulose derivative, e. g., ethyl cellulose, compositions. Compositions plasticized with the aforesaid new compounds are suitable for use in the preparation of artificial leather, lacquers and other coating compositions, films, molded plastics, etc.

The carbonates of hydroxybenzoic acid esters of the present class are prepared by reacting a glycol or glycol-ether ester of an hydroxybenzoic acid with phosgene in the presence of a caustic alkali according to the method disclosed by Ernest F. Grether in U. S. Patents Nos. 1,877,304 and 1,877,305. The reaction takes place according to the following equation:

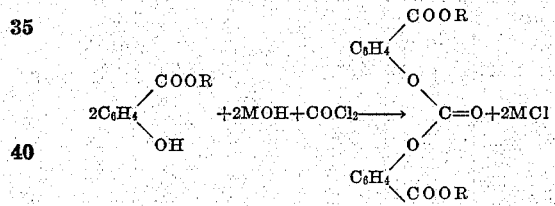

wherein R represents the glycol or glycol-ether radical, and M represents an alkali metal. The hydroxybenzoic acid esters employed as starting materials may be prepared by esterifying a glycol or an alkyl ether of a glycol with an hydroxybenzoic acid in accordance with the usual procedure employed in preparing esters.

The reaction for the production of the new carbonates is preferably carried out by dissolving the hydroxybenzoic acid ester, e. g., beta-ethoxyethyl salicylate, gamma-hydroxypropyl 4-hydroxybenzoate, beta-butoxyethyl 3-hydroxybenzoate, etc., in an inert solvent, such as acetone or methyl ethyl ketone, and thereafter adding phosgene and a concentrated aqueous solution of an alkali metal hydroxide, while cooling and stirring the mixture. The reactants are usually employed in the theoretical proportions, viz., one-half mole of phosgene and one mole of alkali metal hydroxide per mole of ester, but other proportions may be employed if desired. Upon completion of the reaction, the mixture is extracted with a solvent such as benzene, and the extract washed with water to remove the alkali metal chloride which is formed in the reaction. The carbonate product is obtained in substantially pure form by removing the solvent and any unreacted hydroxybenzoic ester by fractional distillation under vacuum. If desired, however, the product may be further purified by fractional distillation under vacuum, or by crystallization from a suitable solvent, such as ethanol.

The following examples will illustrate several ways in which the principle of the invention has been carried out, but are not to be construed as limiting the same:

Example 1

105 grams (0.50 mole) of the beta-ethoxyethyl ester of salicyclic acid was dissolved in 210 grams of acetone and the solution was placed in a three-necked flask fitted with a stirrer, a dropping funnel, and a gas inlet. The gas inlet extended just to the surface of the liquid. The solution was cooled to approximately 2° C. by means of an ice bath, and 28 grams (0.5 mole) of potassium hydroxide in the form of a 50 per cent aqueous solution was slowly added from the dropping funnel, while at the same time a current of phosgene was passed into the reaction mixture through the gas inlet. When all of the potassium hydroxide had been added and the solution became neutral, the supply of phosgene was shut off and the reaction mixture was diluted with ice water. The solution was extracted with benzene, washed several times with water, and the washed extract dried over anhydrous calcium chloride. The benzene and a small amount of unreacted beta-ethoxyethyl salicylate were removed by distillation under reduced pressure and the carbonate product was obtained as colorless, high-boiling liquid having a mild, pleasant odor. The carbonate of beta-ethoxyethyl salicylate has a specific gravity of 1.2124 at 20/20° C., and an index of refraction $$n_D^{20} = 1.5252$$

It has the formula:

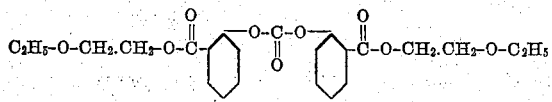

Example 2

119 grams (0.50 mole) of beta-butoxyethyl 4-hydroxybenzoate was dissolved in acetone and cooled to 0°–5° C. 28 grams of potassium hydroxide in the form of a 50 per cent aqueous solution and phosgene were introduced with stirring into the cooled acetone solution. When the reaction was complete, as indicated by the reaction mixture becoming neutral, the mixture was diluted with ice water, extracted with benzene and the benzene extract washed. Benzene and unreacted ester were distilled off under vacuum, and the product was obtained as a colorless oil which, upon cooling to room temperature, solidified to a white, wax-like paste. Analysis showed this product to be the carbonate of beta-butoxyethyl 4-hydroxybenzoate, having the formula:

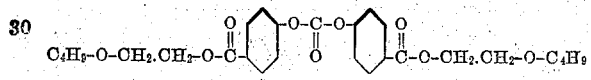

Example 3

A solution of 91.0 grams (0.50 mole) of the ethylene glycol ester of salicyclic acid (beta-hydroxyethyl salicylate) in 265 grams of acetone was cooled and treated with 28 grams (0.50 mole) of potassium hydroxide and phosgene as in Example 1. Upon completion of the reaction, the solution was diluted with ice water, whereupon the carbonate of beta-hydroxyethyl salicylate separated out of solution as a white crystalline solid. The solid product was filtered off, washed with water, and recrystallized from ethanol. The recrystallized product had a melting point of approximately 84° C. The carbonate of beta-hydroxyethyl salicylate has the formula:

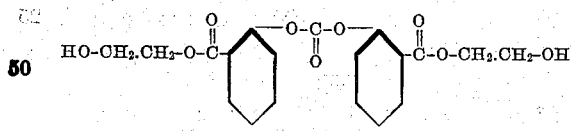

Example 4

A solution of 119 grams (0.50 mole) of beta-butoxyethyl salicylate in acetone was cooled and treated with 28 grams (0.50 mole) of potassium hydroxide as in Example 1. The reacted mixture was diluted with water, extracted with benzene, washed, and dried over calcium chloride. Benzene was removed by distillation, and the carbonate was distilled under vacuum. There was obtained the carbonate of beta-butoxyethyl salicylate, a colorless, viscous oil, distilling at approximately 275° C. under 3 millimeters pressure, and having a specific gravity of 1.1413 at 20/4° C., and an index of refraction, $$n_D^{20} = 1.5172$$

The carbonate of beta-butoxyethyl salicylate has the formula:

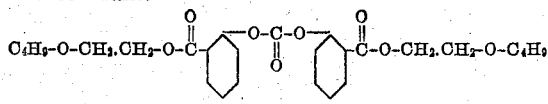

Example 5

105 grams of beta-ethoxyethyl 4-hydroxybenzoate was dissolved in 210 grams of acetone and treated with phosgene and a concentrated potassium hydroxide solution as in Example 1. During addition of the phosgene, a white, crystalline product separated out of solution. The reaction mixture was diluted with ice water and the solid product filtered off and recrystallized from ethanol. The recrystallized carbonate of beta-ethoxyethyl 4-hydroxybenzoate was a white, wax-like solid, melting at approximately 46°–48° C. and having the formula:

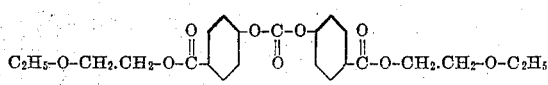

Other carbonates of the present class may be prepared by reacting the corresponding ether-esters of hydroxybenzoic acids with phosgene and an alkali in accordance with the procedure hereinbefore described. Specific examples of such esters are beta-ethoxyethyl 3-hydroxybenzoate, gamma-propoxypropyl salicylate, beta-ethoxyethoxyethyl 4-hydroxybenzoate, the salicylate of the methyl ether of tetramethylene glycol, beta-hexoxyethyl salicylate, the 3-hydroxybenzoate of the propyl ether of tetraethylene glycol, the 4-hydroxybenzoate of the lauryl ether of ethylene glycol, gamma-hydroxypropyl 3-hydroxybenzoate, beta-propoxyethoxyethyl 4-hydroxybenzoate, etc.

Other modes of applying the principle of our invention may be employed instead of those explained, change being made as regards the materials employed, provided the products stated by any of the following claims or the equivalent of any such stated products be employed.

We therefore particularly point out and distinctly claim as our invention:

1. A carbonate of an ester of an hydroxybenzoic acid having the general formula:

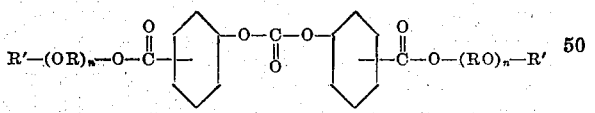

wherein R represents an alkylene radical containing at least 2 carbon atoms, R' represents a substituent selected from the class consisting of hydrogen and alkyl radicals, and $n$ represents an integer.

2. A carbonate of an ester of an hydroxybenzoic acid having the general formula:

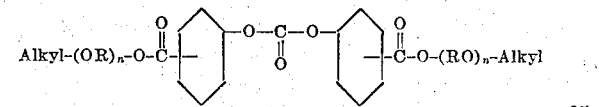

wherein R represents an alkylene radical containing at least 2 carbon atoms, and $n$ represents an integer.

3. A carbonate of an ester of an hydroxybenzoic acid having the general formula:

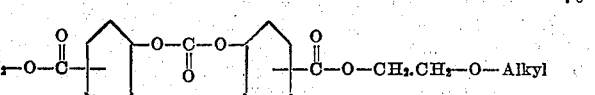

4. The carbonate of the beta-ethoxyethyl ester of 4-hydroxybenzoic acid, a white, waxy solid having a melting point of approximately 46°–48° C., and having the formula:

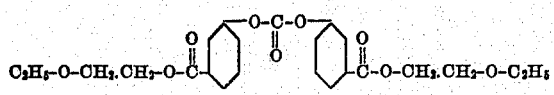

5. The carbonate of the beta-ethoxyethyl ester of salicylic acid, a colorless liquid having a specific gravity of 1.2124 at 20/20° C., an index of refraction $$n_D^{20} = 1.5252$$

and having the formula:

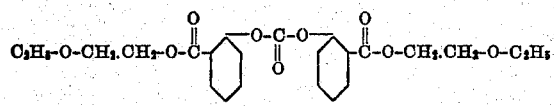

6. The carbonate of the beta-butoxyethyl ester of salicyclic acid, a colorless, viscous liquid distilling at approximately 275° C. under 3 millimeters pressure, and having a specific gravity of 1.1413 at 20/40° C., and the formula:

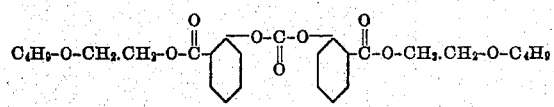

ERNEST F. GRETHER.
RUSSELL B. DU VALL.